United States Patent
Hansen et al.

(10) Patent No.: US 7,786,928 B2
(45) Date of Patent: Aug. 31, 2010

(54) MONOSTATIC PLANAR MULTI-BEAM RADAR SENSOR

(75) Inventors: Thomas Hansen, Hildesheim (DE); Martin Schneider, Hildesheim (DE); Joerg Schoebel, Salzgitter (DE); Oliver Brueggemann, Ilsede (DE)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 11/662,304

(22) PCT Filed: Jul. 18, 2005

(86) PCT No.: PCT/EP2005/053449

§ 371 (c)(1),
(2), (4) Date: Jul. 2, 2008

(87) PCT Pub. No.: WO2006/029926

PCT Pub. Date: Mar. 23, 2006

(65) Prior Publication Data

US 2008/0297400 A1 Dec. 4, 2008

(30) Foreign Application Priority Data

Sep. 13, 2004 (DE) ........................ 10 2004 044 130

(51) Int. Cl.
*G01S 13/48* (2006.01)
*G01S 7/02* (2006.01)
*G01S 7/35* (2006.01)
*G01S 13/00* (2006.01)
*G01S 13/93* (2006.01)

(52) U.S. Cl. .............................. 342/175; 342/5; 342/11; 342/70; 342/82; 342/89; 343/711; 343/753; 343/700 MS

(58) Field of Classification Search ............. 343/700 R, 343/753–755, 700 MS, 711–717; 701/300, 701/301; 342/5–11, 27–28, 59, 70–72, 82–103, 342/118, 128–133, 165–175, 195, 73–81, 342/367–377

See application file for complete search history.

(56) References Cited

U.S. PATENT DOCUMENTS 3,761,936 A 9/1973 Archer et al.
5,181,037 A * 1/1993 Komatsu ..................... 342/70

(Continued)

FOREIGN PATENT DOCUMENTS

DE 196 10 850 4/1997

(Continued)

OTHER PUBLICATIONS

A.F. Jacob, C. Metz, J. Grubert, J. Heyebn, L.C. Lange: "Advanced radar concepts for automotive applications" IEEE MTT-S International Microwave Symposiums 2002, 2002, XP009057098.

(Continued)

*Primary Examiner*—Bernarr E Gregory
(74) *Attorney, Agent, or Firm*—Kenyon & Kenyon LLP

(57) ABSTRACT

A monostatic multi-beam radar sensor for motor vehicles, having a group antenna, a planar lens having multiple inputs, and a homodyne mixer system, wherein the mixer system comprises multiple transfer mixers that are connected in parallel to the inputs of the lens.

7 Claims, 2 Drawing Sheets

U.S. PATENT DOCUMENTS

| | | | | |
|---|---|---|---|---|
| 5,229,774 | A * | 7/1993 | Komatsu | 342/70 |
| 5,831,582 | A * | 11/1998 | Muhlhauser et al. | 343/753 |
| 5,909,191 | A * | 6/1999 | Hirshfield et al. | 342/174 |
| 5,933,109 | A * | 8/1999 | Tohya et al. | 342/175 |
| 5,949,365 | A * | 9/1999 | Wagner | 342/70 |
| 6,043,772 | A * | 3/2000 | Voigtlaender et al. | 342/70 |
| 6,107,955 | A * | 8/2000 | Wagner | 342/70 |
| 6,137,434 | A * | 10/2000 | Tohya et al. | 342/70 |
| 6,215,438 | B1 * | 4/2001 | Oswald et al. | 342/70 |
| 6,271,798 | B1 * | 8/2001 | Endo et al. | 342/70 |
| 6,414,624 | B2 * | 7/2002 | Endo et al. | 342/70 |
| 6,462,700 | B1 * | 10/2002 | Schmidt et al. | 342/70 |
| 6,686,867 | B1 * | 2/2004 | Lissel et al. | 342/70 |
| 7,119,733 | B2 * | 10/2006 | Schoeberl et al. | 342/70 |
| 2004/0164891 | A1 * | 8/2004 | Schoeberl et al. | 342/70 |
| 2005/0156779 | A1 * | 7/2005 | Wixforth | 342/70 |
| 2006/0114146 | A1 * | 6/2006 | Lindenmeier et al. | 342/70 |

FOREIGN PATENT DOCUMENTS

| | | |
|---|---|---|
| DE | 19951123 | 2/2001 |
| DE | 10057564 | 5/2002 |
| DE | 10235338 | 2/2004 |
| EP | 0793291 | 9/1997 |
| EP | 0959521 | 11/1999 |
| EP | 1291966 | 3/2003 |
| EP | 1431773 | 6/2004 |

OTHER PUBLICATIONS

Lee J J et al: "Multibeam Array Using Rotman Lens and RF Heterodyne" IEEE Antennas and Propagation Society International Symposium 1996 Digest. Baltimore, Jul. 21-26, 1996. Held in Conjunction With the USNC/URSI National Radio Science Meeting, New York, IEEE, US, Bd. vol. 3, Jul. 21, 1996, Seiten 1612-1615.

* cited by examiner

MONOSTATIC PLANAR MULTI-BEAM RADAR SENSOR

FIELD OF THE INVENTION

The present invention relates to a monostatic multi-beam radar sensor for motor vehicles, having a group antenna, a planar lens having multiple inputs, and a homodyne mixer system.

BACKGROUND INFORMATION

Radar sensors are increasingly being used in motor vehicles in order to sense the traffic environment in the context of driver assistance systems, for example for radar-assisted adaptive cruise control (ACC). A certain angular resolution capability is achieved by the use of a multi-beam radar sensor, so that for each vehicle that is detected, a decision can be made as to the lane in which it is located.

In multi-beam radar sensors that are common at present, multiple antenna patches that each generate a beam are disposed next to one another in the focal plane of a refractive lens that has a refractive index suitable for microwaves, so that the radar beams are concentrated as in the case of an optical lens. The location of the antenna patch determines the direction in which the respective radar beam is emitted. In a monostatic antenna concept, the radar signal reflected from the detected objects is focused by the same lens back onto the patch that generated the beam. These known radar sensors are relatively bulky, since their installation depth must correspond approximately to the focal length of the lens.

German Published Patent Application No. DE 199 51 123 discloses a radar sensor of the aforesaid kind in which a planar group antenna is used as an antenna, and a planar lens (a so-called Rotman lens) is used instead of the refractive lens. This makes possible a much thinner design.

The group antenna has antenna elements disposed in matrix form in rows and columns. The antenna elements in each vertical column are preferably triggered at least approximately in-phase, thus resulting in beam shaping vertically. The Rotman antenna is a planar microwave guide having multiple outputs that are each connected to one column of the antenna elements via delay lines of different lengths. The geometry of the planar microwave guide and the lengths of the delay lines are selected so that a phase relationship between the antenna columns is obtained by way of different signal transit times within the lens, thus providing beam shaping horizontally and a desired directional characteristic. Because the Rotman lens moreover has multiple inputs, it is possible, by selecting the input, to determine the direction in which the principal lobe of the radar beam is emitted. The radar lobe can thus be pivoted horizontally by injecting the radar signal successively through different inputs of the lens, so that the entire detection angle region of the radar sensor can be scanned during one complete swing. In this case, therefore, only a single transmit and receive system, with a single mixer, is required for the multiple radar beams.

In a publication by A. F. Jacob, C. Metz, J. Grubert, J. Heyen, and L. C. Stange entitled "Advanced Radar Concepts for Automotive Applications," IEEE MTT-S International Microwave Symposium IMS 2002, this concept is compared with an alternative concept in which all the radar beams are generated simultaneously, and the radar echoes from the various directions are received simultaneously. Here a separate transmit and receive device, with its own mixer, is required for each beam. An advantage of this concept, however, is the fact that because of the fixed phase and amplitude relationship between the individual beams, the angle information contained in the radar echoes can be extracted—by time-synchronized scanning (digitizing) of intermediate-frequency signals of the individual beam lobes—with no need for a particular phase reference. A further advantage is that a complete radar measurement in the entire detection angle region can be performed within a shorter cycle time, and/or a longer measurement time is available for the individual measurement; in the case of a frequency modulated continuous wave (FMCW) radar, for example, this allows improved resolution in determining the distances and relative velocities of the detected objects.

The function of the mixer system is to mix the received radar signal, whose frequency is on the order of, for example, 77 GHz, with a high-frequency signal of a local oscillator, so that the mixing yields an intermediate-frequency signal suitable for further evaluation.

In a homodyne mixer system, a portion of the signal of an oscillator that generates the signal to be transmitted is diverted and used as a local oscillator signal, so that the transmitted signal and the signal of the local oscillator have the same frequency. The intermediate frequency then corresponds to the frequency difference between the local oscillator signal and the received signal, and in a Doppler radar depends on the Doppler shift. In an FMCW radar, the frequency of the transmitted signal, and consequently the local oscillator frequency as well, are modulated in ramp form. The intermediate frequency then also depends on the signal transit time and thus on the distance of the detected object, and is on the order of from 0 to a few 100 kHz.

In a monostatic system, the signal that is received by the antenna and is to be sent to the mixer must furthermore be separated from the transmitted signal that is traveling on the same line to the antenna. This can be done, for example, using a circulator that on the one hand conveys the signal coming from the oscillator almost losslessly to the antenna, and on the other hand conveys the signal coming from the antenna almost losslessly to the mixer. In a context of parallel processing of the signals from multiple radar beams, a separate circulator would then be needed for each channel. This solution is hardly practical for motor vehicles, however, because of the space requirements and the relatively high cost of the circulator.

A variety of other homodyne mixing concepts are known, which nevertheless generally require acceptance of certain power losses.

In combination with a push-pull mixer constituted by a coupler and two diodes, for example, it is possible to use a further coupler, e.g. a ring hybrid coupler or a 90-degree hybrid coupler, that splits the signal coming from the oscillator into two portions, of which one is conveyed to the antenna and the other is conveyed as a local oscillator signal to the mixer, and that at the same time splits the signal received from the antenna into two portions, one of which is conveyed to the mixer. The other portion of the received signal, however, is fed back into the oscillator output and is therefore lost.

In the case of an unbalanced mixer having only a single nonlinear diode, a Wilkinson splitter can also be used instead of the coupler.

The previously mentioned publication of Jacob et al. describes a mixing concept with a coupler in which an out coupled portion of the signal coming from the oscillator is annihilated in a terminating resistor.

German Published Patent Application No(s). DE 196 10 850 and DE 102 35 338 describe examples of so-called transfer mixers in which the signal coming from the oscillator is conveyed exclusively to the mixer. The mixer is in this case tuned so that a portion of the oscillator signal is passed through the mixer to the antenna; this type of mixer is therefore also referred to as a "blowthrough" mixer.

SUMMARY OF THE INVENTION

The invention having the features described in claim 1 creates, at low cost and with a comparatively simple and compact circuit assemblage, a low-loss monostatic multi-beam radar sensor, having a planar lens, that enables parallel processing of the signals of the multiple radar beams. This is achieved by the use of transfer mixers. Each input of the lens, and therefore each of the simultaneously generated radar beams, has its own transfer mixer associated with it. Because of the particular properties of transfer mixers, the mixers can be disposed, in the required quantity, in a small space on a circuit board, so that short conduction paths are achieved and the power losses of the system as a whole can thus be kept very low. Parallel processing is particularly advantageous specifically in conjunction with a planar lens, because in such a lens relatively strong secondary lobes occur that complicate determination of the azimuth angle of the detected objects by amplitude comparison. This is because with parallel processing, the phase relationship between the signals received in the various channels can also be evaluated in order to determine the azimuth angle, with no need for a phase reference, given the fact that the signals received from the secondary lobes are phase-shifted 180 degrees with respect to signals from the main lobe. Parallel processing, and thus the elimination of a channel switchover system and a phase reference signal, allows the use of transfer mixers, which in turn are what facilitate, or in fact make possible at all, the construction of a circuit suitable for parallel processing.

The parallel processing in multiple channels made possible by the invention is particularly advantageous in an FMCW radar.

The transfer mixer can be embodied optionally as a push-pull mixer or as a single-diode mixer. The one diode or two diodes are preferably biased by the application of DC voltage, in such a way that the working point of the diode, and thus the tuning and transmissivity of the transfer mixer with respect to the antenna, can be set appropriately by way of the magnitude of the bias.

In a particularly simple embodiment, a single diode is connected directly between the output of the oscillator and the antenna. The intermediate frequency can then be picked off between the diode and the antenna, and leakage of the high-frequency signal via the intermediate-frequency output and the DC voltage terminals can be prevented by high-frequency suppression.

The group antenna, the planar lens, and the transfer mixers can be disposed on a common circuit board constituted by a microwave substrate, thus achieving a very thin design that is particularly favorable for installation in motor vehicles. Also optionally possible is a folded construction in which two circuit boards, of which one carries the group antenna and the other the planar lens and the mixers, rest in planar fashion on one another and are separated from each other by a metallized intermediate layer. This allows the basal area of the board to be approximately halved. Connection between the lens and the group antenna is then accomplished, for example, via conductive through-plating, or preferably by radiation coupling through coupling slots in the metallized intermediate layer.

The lens is preferably a Rotman lens that can be manufactured with an etching technique as a planar conductor on the microwave-compatible substrate of the circuit board. Optionally, however, the Rotman lens can also be embodied as a waveguide that can be manufactured by milling into the board, or as a "waveguide" manufactured by way of vias in the intermediate layers of a multi-layer circuit board.

BRIEF DESCRIPTION OF THE DRAWINGS

Exemplary embodiments of the invention are depicted in the drawings and are explained in more detail in the description below.

DETAILED DESCRIPTION

Figure 1:
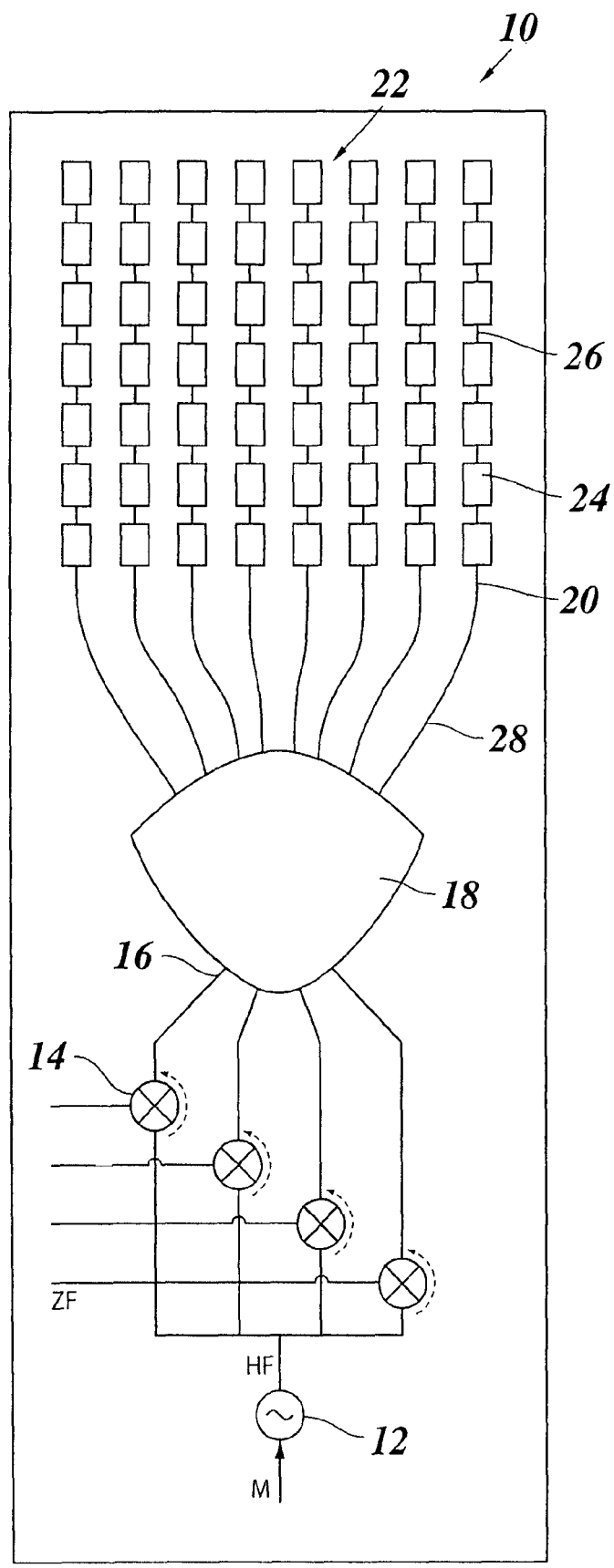
FIG. 1 is a schematic view of a multi-beam radar sensor in accordance with an embodiment of the invention.

FIG. 1 shows the configuration of a radar sensor on a circuit board 10 made of a microwave-compatible material. As an example, it will be assumed that this is an FMCW radar. An oscillator 12, which is shown here on circuit board 10 but can optionally also, however, be disposed outside the circuit board, accordingly has conveyed to it a modulation signal M that determines the ramp-shaped modulation of the frequency of oscillator 12. The oscillator supplies a high-frequency signal HF whose frequency is, for example, on the order of 77 GHz. This high-frequency signal is conveyed via parallel lines to multiple (in the example shown, four) transfer mixers 14 that are connected to four inputs 16 of a Rotman lens 18. Dashed arrows in FIG. 1 symbolize the fact that the high-frequency signal is passed through the transfer mixers to inputs 16. Appropriate selection of the line lengths, and/or matching elements (not shown), ensure that the high-frequency signal reaches the inputs of Rotman lens 18 on all four channels in-phase, or at least with a defined phase relationship. Matching elements that are necessary for impedance matching are also not depicted in the drawings for the sake of clarity.

Rotman lens 18 is a planar conductor in which the microwave signals injected via inputs 16 can propagate in planar fashion. The Rotman lens possesses a plurality of delay lines 28 and outputs 20 located opposite the four inputs 16. The specific geometry of Rotman lens 18, and the lengths of delay lines 28, determine the phase relationship between the high-frequency signals that reach the various outputs 20.

Additionally disposed on circuit board 10 is a group antenna 22 having a matrix-shaped assemblage of antenna elements 24. The matrix has multiple columns 26 in which antenna elements 24 are interconnected. Each column 26 is moreover connected to one of the outputs of Rotman lens 18. The conductive connections between the individual antenna elements 24 of each column are preferably matched in such a way that the radar signal from all the antenna elements of a column is radiated in-phase. If the radar sensor is built into a motor vehicle, columns 26 are oriented vertically, so that the preferably substantially in-phase emission of the radar signal via antenna elements 24 results in beam shaping and concentration vertically.

The phase relationship between the various columns 26, on the other hand, is determined by the geometry of Rotman lens 18 so as to imitate the effect of an optical lens horizontally, so that beam concentration is achieved while secondary lobes are largely suppressed. The phase relationship between columns 26 is different for the various components of the high-frequency signal injected via the various inputs 16 of the Rotman lens, and corresponds to a different directional characteristic in each case, so that group antenna 22 generates multiple radar beams fanned out horizontally.

In order to simplify the presentation, it will now be assumed that exactly one of these radar beams strikes an obstacle, for example another vehicle, and is reflected therefrom. The reflected beam is then received by antenna elements 24 and focused by Rotman lens 18, similarly to the situation in an optical lens, back onto input 16 that is associated with that beam. From input 16, the received signal then travels back into the associated transfer mixer 14, where it is mixed with high-frequency signal HF of the oscillator. An intermediate-frequency signal ZF, whose frequency corresponds to the difference between the two signals that were mixed in the transfer mixer, is thus obtained at an intermediate-frequency output of transfer mixer 14. In the case of an FMCW radar, this difference depends on the distance and relative velocity of the reflecting object.

Because in reality the radar beams emitted from group antenna 22 overlap, a reflecting object generates a radar echo not only in one but in several of the parallel channels of the radar sensor, so that multiple transfer mixers 14 receive a signal from that object and form therefrom, by mixing, a corresponding intermediate-frequency signal ZS. Because all the radar beams involved sense the same object simultaneously, the object has the same distance and the same relative velocity for all channels, so that the intermediate-frequency signals generated by the various transfer mixers have the same frequency. The amplitude relationship and/or phase relationship of these intermediate-frequency signals provides information as to the azimuth angle of the detected object.

If multiple objects are detected simultaneously, the intermediate-frequency signals contain multiple frequency components corresponding to the distance and relative velocity of the respective object.

The frequency spectra of intermediate-frequency signals ZF are evaluated in known fashion in an evaluation unit (not shown).

Figure 2:
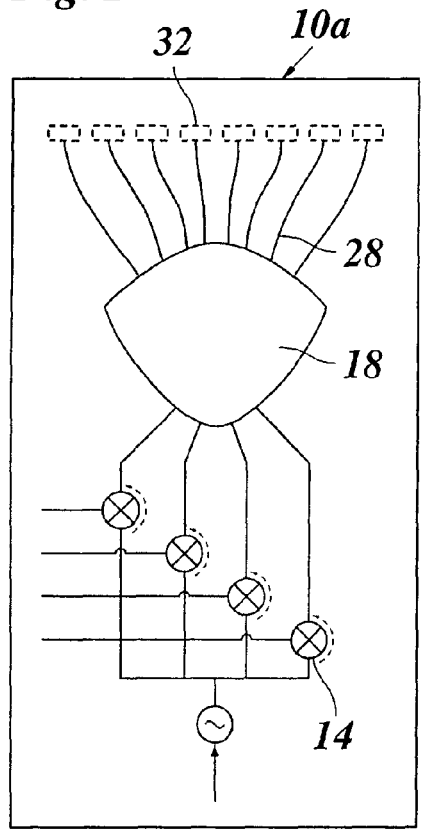
FIGS. 2, 3, and 4 are a rear view, side view, and front view of a multi-beam radar sensor in accordance with another exemplary embodiment.
Figure 3:
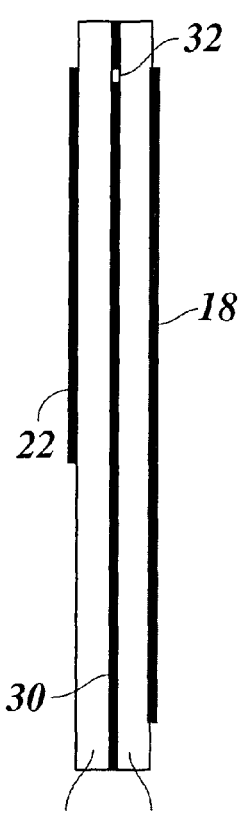
Figure 4:
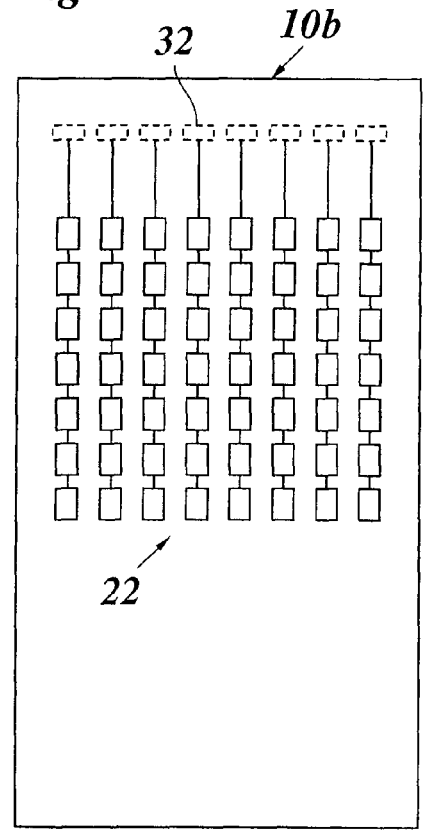

FIGS. 2 to 4 show a modified exemplary embodiment in which transfer mixers 14 and Rotman lens 18 on the one hand, and group antenna 22 on the other hand, are disposed on different circuit boards 10a, 10b, which rest against one another back to back and between which a metallized intermediate layer 30 is inserted. Intermediate layer 30 has, for each delay line 28, a coupling slot 32 that couples the delay line to the associated column of group antenna 22. This embodiment makes possible a particularly compact configuration of the radar sensor. Instead of a metallic intermediate layer, multiple substrate planes and metal planes (having respective coupling slots or cutouts) can also be provided. In this context, good electrical connection of the two high-frequency metal planes must be achieved. Low-frequency and digital signals can be conveyed on the inner metal planes.

Figure 5:
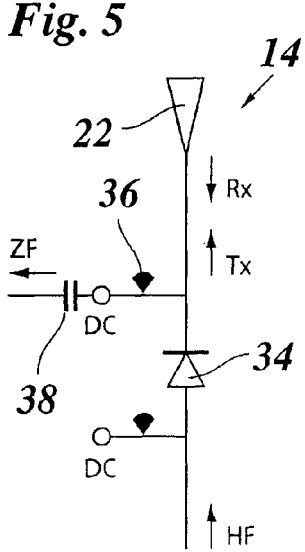
FIGS. 5 to 7 are simplified circuit diagrams for various embodiments of transfer mixers.

FIG. 5 shows, in the form of a simplified circuit diagram, a particularly simple configuration of one of transfer mixers 14. High-frequency signal HF is applied to a nonlinear semiconductor diode 34 whose working point is set, by application of a bias voltage DC, so as to achieve good impedance matching (optionally with the aid of additional matching elements that are not shown), and the diode is transmissive to a certain extent for the high-frequency signal, so that this signal is passed on as a transmit signal Tx for antenna 22 (Rotman lens 18 is not shown here). Signal Rx received by the antenna travels back in the opposite direction to diode 34 where it is superimposed on the transmitted signal, thereby forming, because of the nonlinearity of the diode, intermediate-frequency signal ZF that is picked off, for example, between the diode and the antenna. High-frequency suppressors 36 prevent leakage of the high-frequency signal via the electrical supply lines that serve to apply the DC voltage and to pick off the intermediate-frequency signal. The intermediate-frequency signal is separated from the applied DC voltage with the aid of a capacitor 38.

The transfer mixer shown in FIG. 5 thus requires only a single diode, which is connected directly between the oscillator and the antenna. This allows economical manufacture of the transfer mixer as well as a compact disposition of its components on circuit board 10 or 10a. The multiple identically constructed transfer mixers 14 can therefore also be disposed in a small space on the circuit board, so that short conduction paths, corresponding to low levels of line attenuation, can be achieved. The transfer mixer itself is also relatively low-loss, so that overall signal losses, including the unavoidable losses in Rotman lens 18, can be minimized in such a way that high sensitivity is attained despite the compact and economical design of the radar sensor.

Figure 6:
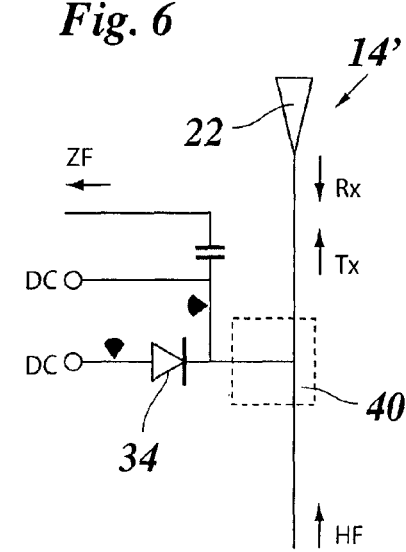

FIG. 6 shows another exemplary embodiment of a transfer mixer 14' in which diode 34 is connected via a T-branch 40 to the conductor path between the oscillator and antenna. In the transfer mixers according to FIG. 5 or 6, the intermediate-frequency signal can also be picked off at a different suitable point, e.g. on the other side of the diode, optionally by way of a separate high-frequency suppressor.

Figure 7:
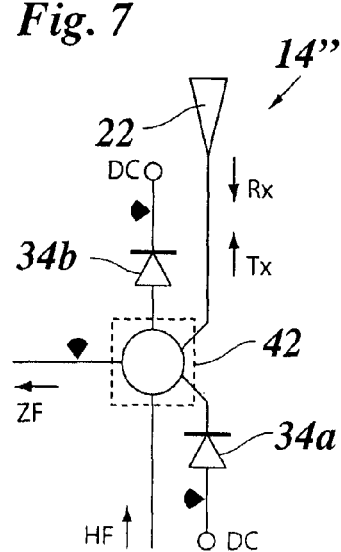

FIG. 7 shows, as a further example, a transfer mixer 14" that is embodied as a push-pull mixer having two diodes 34a, 34b. The diodes are located in the coupling paths of a coupler 42, for example a ring hybrid coupler or a 90-degree coupler. Here as well, the diodes are biased with a DC voltage and are tuned so as to achieve good matching, although the reflection factor at diodes 34a, 34b differs from zero, so that a certain portion of the high-frequency signal is reflected and coupled into the antenna path as transmit signal Tx. Intermediate-frequency signal ZF is usually picked off at the coupler.

What is claimed is:

1. A monostatic multi-beam radar sensor for a motor vehicle, comprising:
    a group antenna;
    a planar lens including multiple inputs;
    a homodyne mixer system, wherein the homodyne mixer system includes multiple transfer mixers that are connected in parallel to the inputs of the planar lens;
    a metallized intermediate layer;
    a first circuit board; and
    a second circuit board, wherein:
        the planar lens is disposed on the first circuit board,
        the group antenna is disposed on the second circuit board,
        the first circuit board and the second circuit board rest against one another back to back, and
        the first circuit board and the second circuit board are separated by the metallized intermediate layer.

2. The radar sensor as recited in Claim 1, further comprising:
    a common circuit board on which the transfer mixers and the planar lens are disposed.

3. The radar sensor as recited in Claim 1, further comprising:
    a common circuit board on which the lens and the group antenna are disposed.

4. The radar sensor as recited in claim 1, wherein the planar lens and the group antenna are coupled to one another via coupling slots in the metallized intermediate layer.

5. The radar sensor as recited in Claim 1, further comprising:
an oscillator, wherein each transfer mixer includes a single-diode mixer, and wherein a diode of the single-diode mixer is connected via a T-branch to a signal path that leads from the oscillator to one of the inputs of the planar lens.

6. The radar sensor as recited in Claim 1, further comprising:
an oscillator having a modulatable frequency, wherein the transfer mixers are connected to the oscillator.

7. The radar sensor as recited in claim 6, wherein the radar sensor includes an FMCW radar sensor.

* * * * *